United States Patent
Buxton

(10) Patent No.: US 10,097,750 B2
(45) Date of Patent: Oct. 9, 2018

(54) CONTROLLING THE FOCUS OF A CAMERA USING FOCUS STATISTICS

(71) Applicant: Imagination Technologies Limited, Kings Langley (GB)

(72) Inventor: Paul Buxton, Hemel Hempstead (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 15/401,182

(22) Filed: Jan. 9, 2017

(65) Prior Publication Data
US 2017/0201675 A1    Jul. 13, 2017

(30) Foreign Application Priority Data
Jan. 7, 2016 (GB) .................................. 1600255.2

(51) Int. Cl.
*H04N 5/232* (2006.01)
*H04N 5/14* (2006.01)
*G03B 13/36* (2006.01)

(52) U.S. Cl.
CPC ......... *H04N 5/23212* (2013.01); *H04N 5/144* (2013.01); *H04N 5/23219* (2013.01); *G03B 13/36* (2013.01)

(58) Field of Classification Search
CPC .................................................. H04N 5/23212
See application file for complete search history.

(56) References Cited

U.S. PATENT DOCUMENTS

| 5,416,515 A | 5/1995 | Arai et al. | |
|---|---|---|---|
| 2013/0038708 A1* | 2/2013 | Iwasaki | A61B 1/00006 348/65 |
| 2015/0334289 A1 | 11/2015 | Yoshino | |

FOREIGN PATENT DOCUMENTS

| JP | H0215221 A | 1/1990 |
|---|---|---|
| JP | 2010135984 A | 6/2010 |

* cited by examiner

*Primary Examiner* — Ahmed A Berhan
(74) *Attorney, Agent, or Firm* — Vorys, Sater, Seymour and Pease LLP; Vincent M DeLuca

(57) ABSTRACT

Apparatus for controlling the focus of a camera arranged to capture a sequence of frames, includes an image processor configured to: form an image characteristic for a plurality of blocks of a first frame, each block comprising one or more pixels of the first frame; and calculate an image parameter for each block by combining the image characteristics of blocks lying within a predefined zone relative to that block; and a focus controller configured to derive a measure of focus for a selected frame area of the first frame by identifying a set of blocks whose respective predefined zones, when combined, substantially represent the selected frame area, and forming a measure of focus for the selected frame area by so combining the image parameters of the set of blocks; wherein the focus controller is configured to generate a signal for controlling camera focus in dependence on the measure of focus formed for the selected frame area of the first frame.

20 Claims, 4 Drawing Sheets

CONTROLLING THE FOCUS OF A CAMERA USING FOCUS STATISTICS

BACKGROUND OF THE INVENTION

This invention relates to apparatus and a method for controlling the focus of a camera.

Two types of autofocus are typically employed in compact digital cameras and smartphones: contrast detection autofocus and phase detection autofocus.

With contrast detection autofocus, a sequence of frames is captured by the camera and the level of contrast is monitored in defined areas of the frames. The autofocus system adjusts the focus setting of the camera until the contrast in one or more of the areas is maximised and the camera is considered to be in focus. The focus setting of a camera may be described in terms of the focus distance, i.e. the distance in front of the camera at which objects will appear in focus in the image.

Phase detection is achieved through the use of additional hardware. A beam splitter is used to split incoming light into two components (e.g. red and green light) and direct it to a sensor. The sensor determines the degree of focus from the relative separation of the two light components. The sensor can also determine whether the focus distance of the camera needs to be increased or decreased from the relative direction of separation of the two light components: if the longer wavelength light is one side of the sensor compared to the shorter wavelength light then the focus distance is to be increased, and if the longer wavelength light is one side of the sensor compared to the shorter wavelength light then the focus distance is to be decreased.

Contrast detection autofocus typically performs less well than phase detection autofocus. In particular, because the contrast data captured at the device does not include distance information, the device cannot initially determine whether the focus distance of the camera needs to be increased or decreased in order to focus on an object. The device must capture at least two frames and modify the focus distance in a known way between those frames in order to determine whether the change(s) in focus distance improved or worsened the contrast in the captured frames. Furthermore, because the device must process each captured image in order to determine the contrast information in the defined areas of the image, the processing time can delay the point at which the autofocus can update that focus distance of the camera by at least another frame. As a result, contrast detection autofocus is typically significantly slower than phase detection autofocus.

A camera pipeline in a digital camera or smartphone which uses contrast detection autofocus will usually offer a predefined set of focus zones—regions of the image, typically at and around the centre of the frame, at which the camera is capable of performing autofocus. In this case, the camera pipeline would typically be configured to calculate contrast information for each of the zones for use by the autofocus system. This ensures that contrast information is available to the autofocus system at minimal delay. However, in the drive to improve point-and-shoot camera performance, it is becoming increasingly important for autofocus systems to be able to define custom autofocus zones according to the scene captured in the frames. For example, modern camera pipelines often perform face detection, with the autofocus system being configured to define autofocus zones for the faces detected in the frame. This can significantly exacerbate the delays in contrast detection autofocus system.

Processing images (e.g. performing face detection) to identify focus zones is typically an intensive operation which cannot be performed synchronously with frame capture by the camera. In order to perform contrast detection autofocus based on focus zones defined for a frame, it is normally necessary for (a) one or more frames to be captured in which focus zones are identified, (b) the autofocus system to define the custom focus zones at the camera pipeline so as to enable the pipeline to provide suitable contrast statistics for those zones, and (c) wait for at least two frames to be captured for which the camera pipeline provides contrast statistics for the custom zones. Only then is the autofocus system in a position to control the focus distance of the camera using the focus zones identified in the camera pipeline. Even on the latest hardware, this entire process will typically require several frames in order for focus to be achieved.

The limitations of contrast detection autofocus are pushing device manufacturers to, at least in high-end devices, adopt phase detection autofocus systems. The additional phase detection hardware increases the complexity, size and cost of devices.

BRIEF SUMMARY OF THE INVENTION

According to a first aspect of the present invention there is provided apparatus for controlling the focus of a camera arranged to capture a sequence of frames, the apparatus comprising:

an image processor configured to:
form an image characteristic for a plurality of blocks of a first frame, each block comprising one or more pixels of the first frame; and
calculate an image parameter for each block by combining the image characteristics of blocks lying within a predefined zone relative to that block;

and a focus controller configured to derive a measure of focus for a selected frame area of the first frame by identifying a set of blocks whose respective predefined zones, when combined, substantially represent the selected frame area, and forming a measure of focus for the selected frame area by so combining the image parameters of the set of blocks;

wherein the focus controller is configured to generate a signal for controlling camera focus in dependence on the measure of focus formed for the selected frame area of the first frame.

The image characteristic of each block may be a measure of local contrast at that block.

The image processor may be configured to form the image characteristic at each block in dependence on the values of a plurality of pixels of the block or adjacent to the block in the first frame.

The image processor may be configured to calculate the image parameter for each block by summing the image characteristics of blocks lying within the predefined zone relative to that block.

The predefined zone relative to a given block may include: all blocks whose component coordinates are less than or equal to those of the given block, including the given block itself; all blocks whose component coordinates are greater than or equal to those of the given block, including the given block itself; or, all blocks having a first component coordinate greater than or equal to the corresponding first coordinate of the given block and a second component coordinate less than or equal to the corresponding second coordinate of the given block, including the given block itself.

The apparatus may further comprise a focus selector configured to identify the selected frame area in dependence on image data of the first frame.

The focus selector may be configured to process the first frame and/or a preceding frame of a sequence of frames comprising the first frame so as to identify the selected frame area.

The focus selector may be configured to derive the measure of focus for the selected frame area of the first frame by means of a linear combination of the image parameters of the set of blocks, the linear combination being performed according to the identified combination of the predefined zones of the set of blocks which substantially represents the selected frame area.

The linear combination may comprise addition and/or subtraction of the image parameters of the set of blocks.

The focus selector may be configured to identify the selected frame area in a sequence of frames comprising the first frame in dependence on one or more of: a variation in image sharpness; the location of faces identified in the sequence of frames; and the location of motion identified in the sequence of frames.

The apparatus may be arranged to operate on a sequence of frames comprising the first frame and a preceding second frame, the focus controller being configured to derive a measure of focus for the selected frame area of the second frame and the focus controller being configured to generate the signal for controlling camera focus in dependence on a comparison of the measures of focus derived for the selected frame area of the first and second frames.

The apparatus may further comprise a camera configured to capture the sequence of frames including the second and first frames and to adjust its focus in a predefined direction between the second and first frames.

The apparatus may comprise a camera pipeline which includes a camera and the image processor.

The image processor may be a fixed function processor and the focus controller comprises program code executing at a GPU.

The apparatus may be embodied in hardware on an integrated circuit.

The apparatus may be embodied in hardware on an integrated circuit. There may be provided a method of manufacturing, at an integrated circuit manufacturing system, the apparatus. There may be provided an integrated circuit definition dataset that, when processed in an integrated circuit manufacturing system, configures the system to manufacture the apparatus. There may be provided a non-transitory computer readable storage medium having stored thereon a computer readable description of an integrated circuit that, when processed in an integrated circuit manufacturing system, causes the integrated circuit manufacturing system to manufacture the apparatus.

There may be provided an integrated circuit manufacturing system comprising:
  a non-transitory computer readable storage medium having stored thereon a computer readable integrated circuit description that describes the apparatus;
  a layout processing system configured to process the integrated circuit description so as to generate a circuit layout description of an integrated circuit embodying the apparatus; and
  an integrated circuit generation system configured to manufacture the apparatus according to the circuit layout description.

According to a second aspect of the present invention there is provided a method of controlling the focus of a camera arranged to capture a sequence of frames, the method comprising:
  receiving a first frame;
  forming an image characteristic for a plurality of blocks of the first frame, each block comprising one or more pixels of the first frame;
  calculating an image parameter for each block by combining the image characteristics of blocks lying within a predefined zone relative to that block;
  identifying a set of blocks whose respective predefined zones, when combined, substantially represent a selected frame area;
  forming a measure of focus for the selected frame area by combining the image parameters of the set of blocks according to the identified combination of the set of blocks which substantially represents the selected frame area; and
  adjusting camera focus in dependence on the measure of focus formed for the selected frame area of the first frame.

The image characteristic of each block may be a measure of local contrast at that block.

The forming of the image characteristic at each block may be performed in dependence on the values of a plurality of pixels of the block or adjacent to the block in the first frame.

The calculation of the image parameter for each block may comprise summing the image characteristics of blocks lying within the predefined zone relative to that block.

The predefined zone relative to a given block may include: all blocks whose component coordinates are less than or equal to those of the given block, including the given block itself; all blocks whose component coordinates are greater than or equal to those of the given block, including the given block itself; or, all blocks having a first component coordinate greater than or equal to the corresponding first coordinate of the given block and a second component coordinate less than or equal to the corresponding second coordinate of the given block, including the given block itself.

The method may further comprise identifying the selected frame area in dependence on image data of the first frame.

The identifying of the selected frame area may comprise processing the first frame and/or a preceding frame of a sequence of frames comprising the first frame so as to identify the selected frame area.

The identifying the selected frame area may be performed in dependence on one or more of: a variation in image sharpness; the location of faces identified in the sequence of frames; and the location of motion identified in the sequence of frames.

The forming the measure of focus for the selected frame area of the first frame may comprise performing a linear combination of the image parameters of the set of blocks, the linear combination being performed according to the identified combination of the predefined zones of the set of blocks which substantially represents the selected frame area.

The linear combination may comprise addition and/or subtraction of the image parameters of the set of blocks.

The method may further comprise:
  receiving a second frame;

forming an image characteristic for the plurality of blocks of the second frame, each block comprising one or more pixels of the second frame;

calculating an image parameter for each block by combining the image characteristics of blocks lying within a predefined zone relative to that block; and forming a measure of focus for the selected frame area of the second frame by combining the image parameters of the set of blocks according to the identified combination of the set of blocks which substantially represents the selected frame area;

wherein the adjusting camera focus comprises controlling camera focus in dependence on a comparison of the measures of focus derived for the selected frame area of the first and second frames.

The method may further comprise adjusting camera focus in a predefined direction between capture of the second and first frames.

There may be provided computer program code for performing the method of controlling the focus of a camera. There may be provided non-transitory computer readable storage medium having stored thereon computer readable instructions that, when executed at a computer system, cause the computer system to perform the method of controlling the focus of a camera.

BRIEF DESCRIPTION OF THE DRAWINGS

The present invention will now be described by way of example with reference to the accompanying drawings. In the drawings.

DETAILED DESCRIPTION OF THE INVENTION

The following description is presented by way of example to enable a person skilled in the art to make and use the invention. The present invention is not limited to the embodiments described herein and various modifications to the disclosed embodiments will be apparent to those skilled in the art.

There is provided apparatus and a method for controlling the focus of a camera. The apparatus and method may perform contrast detection autofocus in a manner which addresses the problems of contrast detection autofocus discussed above.

Figure 1:
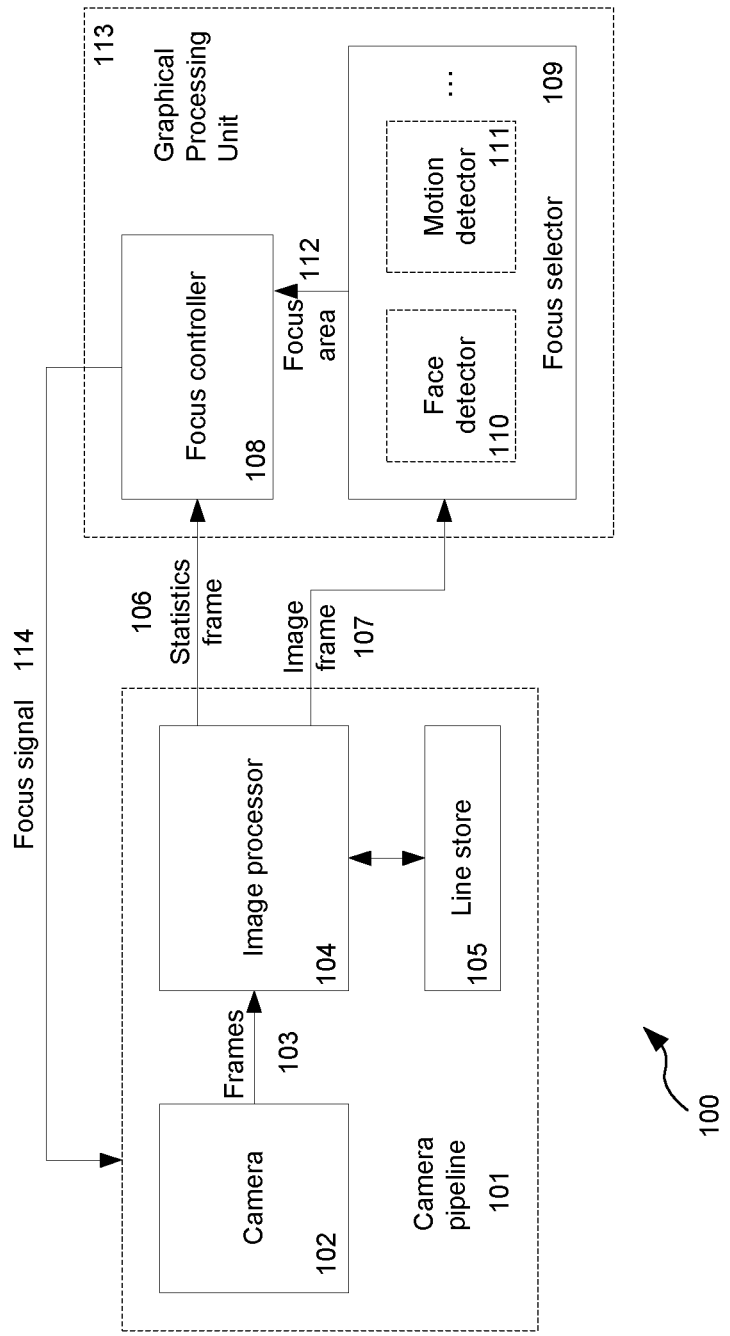
FIG. 1 is a schematic diagram of apparatus for controlling the focus of a camera.

FIG. 1 is a schematic diagram of apparatus for controlling the focus of a camera and configured according to the principles described herein. Apparatus 100 includes an image processor 104 for processing frames 103 received from a camera 102, and a focus controller 108 for performing focus control in dependence on focus statistics 106 generated by the image processor. In the example shown in FIG. 1, the image processor is part of a camera pipeline 101. The camera pipeline may or may not include the camera 102. The image processor 104 may be configured to perform various processing of the camera frames 103 provided by the camera 102, such as RGB triplet formation, sharpening, and generating statistics for use at automatic white balance, focus and exposure control algorithms (which may or may not be embodied at the camera pipeline 101). Image processor 104 may output a captured frame 103 in one or more processed image forms: for example, the image processor could generate from a frame 103 captured at camera 102 one or more of a full-resolution RGB image frame and a low-resolution luma image (e.g. for use at face detector 110). Frames 103 may be captured by camera 102 in a raw image format particular to the sensor used at the camera.

In the example shown in FIG. 1, the focus controller 108 is supported at a graphical processing unit (GPU) 113 which receives an image frame 107 and statistics 106 from the image processor 104. For instance, the focus controller 108 may be a software module executing at GPU 113. This is merely one possible embodiment and various other embodiments of a focus controller are possible (e.g. as software for execution at a general purpose processor such as a CPU, at an FPGA, or in hardware as a fixed-function processor).

The operation of apparatus 100 to control the focus of camera 102 will now be described.

Image processor 104 is configured to process a captured frame 103 so as to provide respective statistics 106 and an image frame 107. The image processor generates statistics for a plurality of blocks of a frame—this frame may be, for example, a captured frame 103 or an intermediate frame generated by the image processor from a captured frame (which may or may not be image frame 107). Each block is a frame region comprising one or more pixels of the frame. In the present example, each block comprises a single RGB pixel of an intermediate RGB frame generated by the image processor from a captured frame 103, with the RGB frame being a full resolution frame formed at the image processor from a respective raw image captured at the camera. Image frame 107 is a lower resolution RGB frame formed at the image processor for provision to the focus selector 109. In other examples, frames may be expressed in other colour systems, such as YUV.

It should be appreciated that, in examples which the image processor generates statistics in respect of blocks of an intermediate frame generated at the image processor from a captured frame 103, that intermediate frame need not be explicitly formed in its entirety so as to be available as a complete frame. The image processor may generate those parts of the intermediate frame which are required for it to calculate statistics for a given block and then discard those parts of the frame when they are no longer required such that at no point in time does the complete intermediate frame exist in memory.

The statistics 106 generated by the image processor in respect of each block of a frame represent one or more image characteristics of the block on the basis of which focus control is to be performed. Any image characteristics may be used which are appropriate to the processing performed by the focus controller—for example, an image characteristic of a block may be a measure or derivative of colour within the block (such as its hue, lightness, brightness, chroma, colorfulness or saturation), a measure or derivative of luminance (e.g. a luma value), or a measure or derivative of local contrast (e.g. luma or colour contrast in a region local to the block). An image characteristic could be particular to one or more colour channels.

An image characteristic of a block may be formed in any suitable manner. An image characteristic may be calculated for each given block of a frame according to a predefined combination of pixel values relative to that block. Image processor 104 may be configured to generate image characteristics in respect of one or more blocks of a frame.

In the present example, the image characteristics generated for a block by the image processor are a measure of local contrast at the block. A suitable measure of contrast may be calculated for a block as a comparison between one or more pixels of the block and/or one or more pixels lying outside the block.

Figure 6:
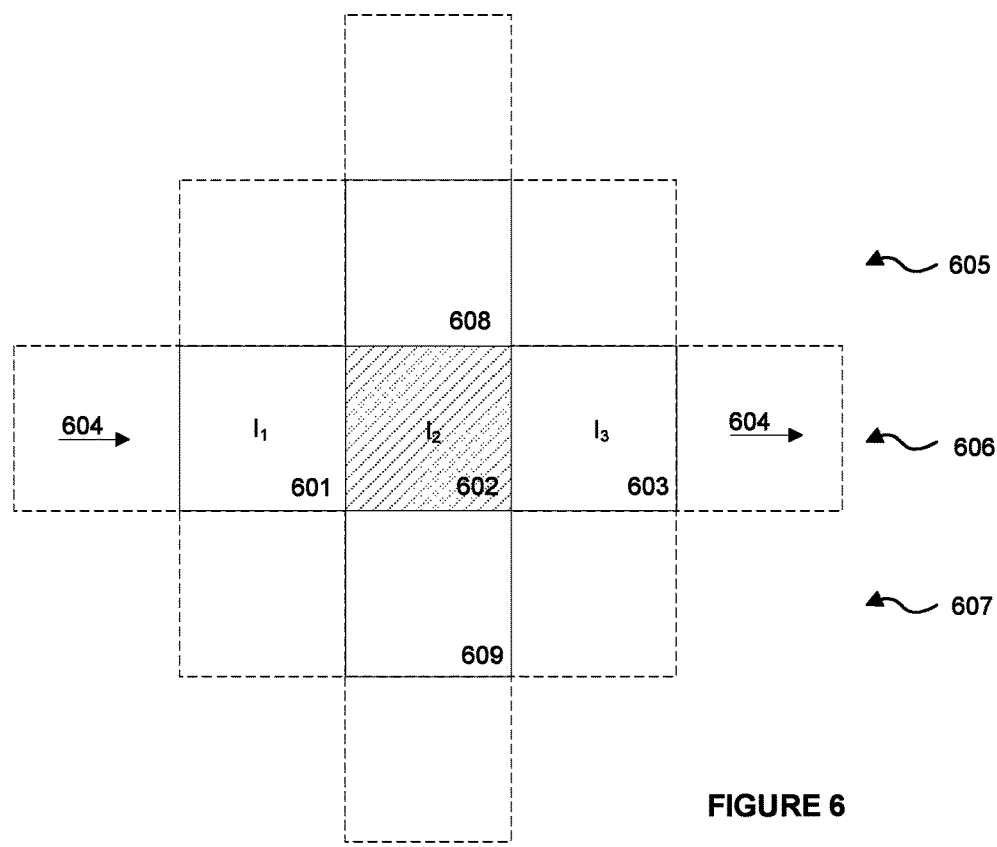
FIG. 6 illustrates performing focus control using a measure of contrast generated according to the principles described herein.

FIG. 6 illustrates the formation of a measure of contrast for a block 602 defined for a frame. A portion of the frame is shown in FIG. 6 comprising blocks 601-603, 608, 609. Each block may comprise one or more pixels of the frame. Typically, image processor 104 will be optimised for generating statistics for incoming frames 103 at low power and latency. The image processor may be configured to process the blocks of each frame in any suitable manner, but to achieve low latency the image processor may be configured to sequentially process the blocks row-by-row, with the measure of contrast of each block being formed in dependence on pixel values of one or more preceding or following blocks of the sequence. This one-dimensional approach avoids the need to store pixel values for multiple rows of blocks.

A simple measure of contrast at block 602 can be formed by comparing the luminance of block 602 (e.g. a luma value formed for the block) to the luminance of one or more adjacent blocks of that row. The luminance of a block may be formed from the luminance values of its one or more constituent pixels (e.g. as an average of the luminance values of its one or more pixels). Measures of luminance may be available for each block of the frame as a result of a previous processing step performed by the image processor on frames 103 received from the camera. For instance, the image processor may be configured to generate a luma value for each block from a RAW image 103 received from the camera.

In the example shown in FIG. 6, the image processor is configured to read row 606 in the direction 604, with the contrast of block 602 being calculated from the luminance values of block 602 and its preceding block 601 in some suitable manner. A simple measure of contrast may be formed as follows from the luma values $I_t$ of the blocks:

$$\text{contrast} = \frac{I_2 - I_1}{I_2} \quad (1)$$

Many other measures of contrast are possible. An alternative and potentially improved measure of contrast may be formed with limited additional processing overhead by further using the luminance value of pixel 603. For example, by comparing the luminance value of block 602 to the average of block values 601 and 603 (each of which may itself correspond to a block of the frame):

$$\text{contrast} = \frac{2I_2 - I_1 - I_3}{2I_2} \quad (2)$$

Alternative and potentially improved measures of contrast may be formed by extending the formation of measures of contrast into two dimensions—e.g. by further using the luminance value of pixels 608 and 609 located on block rows 605 and 607. However, since an image processor configured to sequentially read the blocks of a frame must wait for block 609 to be read before a contrast value can be formed for block 602, such 2D approaches can introduce additional latency into the generation of contrast statistics. Many other arrangements of blocks and approaches to calculating a measure of contrast for a block may be used. For instance, blocks may be arranged in a pattern other than a square grid, and/or blocks may not all be of the same size or shape.

Measures of contrast need not be based on luminance. For instance, measures of contrast may be derived from the colour values of blocks so as to represent a measure of the difference between the colours of blocks (e.g. on a particular colour channel or along a particular axis or curve in colour space): such a measure of contrast may be considered to be a colour contrast.

The measures of contrast generated for one or more blocks of a frame may be made available by the image processor to other processing entities of apparatus 100.

The image processor 104 is further configured to process the image characteristics generated for one or more blocks of a frame so as to generate a statistics frame 106 which comprises the image characteristics of the blocks but encoded to permit focus controller 108 to calculate a measure of the image characteristics of an arbitrary area of the frame at low processing overhead. This may be achieved by configuring the image processor to store for each block of statistics frame 106 an image parameter sum of the image characteristics calculated for blocks lying within a predefined zone relative to that block.

Figure 2:
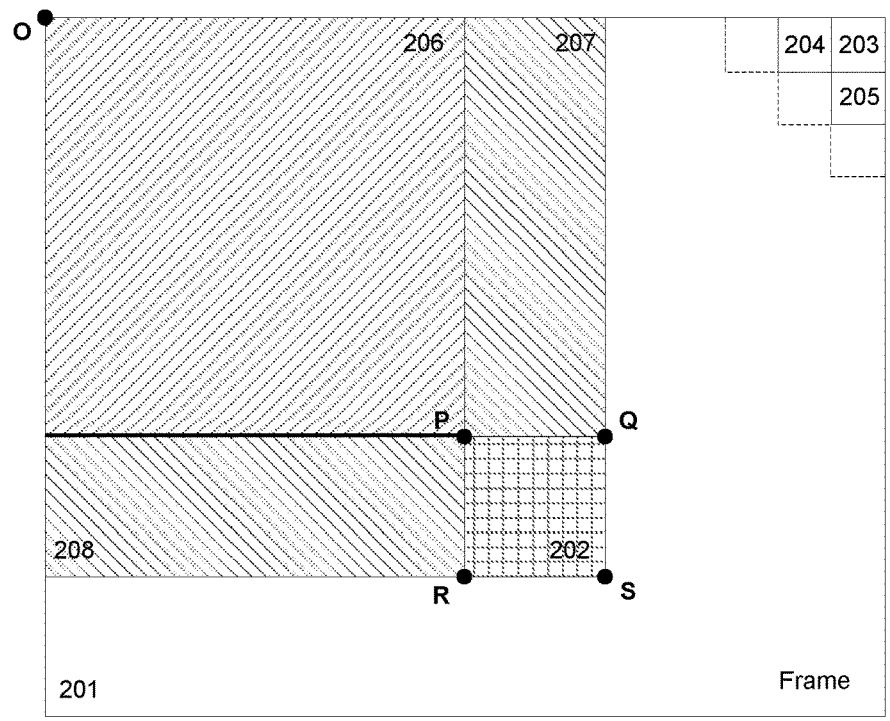
FIG. 2 illustrates a calculation of contrast information for a selected frame area according to a first example.

In a first example illustrated in FIG. 2, the blocks of frame 201 are square or rectangular and arranged in a rectangular grid over the frame—blocks 203, 204 and 205 covering a portion of the frame are shown. For each block, the image processor is configured to form a sum of the image characteristic of the subject block together with the image characteristics of the blocks lying above to and to the left of the subject block—i.e. all those blocks having coordinate components which are less than or equal to the coordinate components of the subject block (a rectangular area bounded by the subject block and the block at the origin O). The sum of this predefined zone relative to the subject block is the image parameter of the subject block. For example: the image parameter of the block at point P in the image is the sum of the image characteristics of all of the blocks lying in zone 206; the image parameter of the block at point Q in the image is the sum of the image characteristics of all of the blocks lying in the zone represented by areas 206 and 207; the image parameter of the block at point R in the image is the sum of the image characteristics of all of the blocks lying in the zone represented by areas 206 and 208; and the image parameter of the block at point S in the image is the sum of the image characteristics of all of the blocks lying in the zone represented by areas 206, 207, 208 and 202. A predefined zone includes the subject block itself.

The choice of origin and hence the predefined zone relative to the subject block may be arbitrary provided that the same origin should be used for all blocks of the frame. For example, in FIG. 2, the origin could be taken to be the point at the bottom-right corner of the frame 201 in which case the relative zone for point P would be all those blocks lying below and to the right of the block at point P.

The image processor may calculate the image parameter for each block in a single pass over the image. This is because the sum of the image characteristics in a predefined zone relative to a given block at position (x,y) in a frame may be calculated according to:

$$I(x,y)=i(x,y)+I(x-1,y)+I(x,y-1)-I(x-1,y-1) \quad (3)$$

where i(x,y) is the image characteristic of the block at (x,y) and I(x,y) is the image parameter calculated for block (x,y)—e.g. according to the sum shown in equation (3).

It may be possible for the image processor to calculate the image parameter for each block immediately after the image characteristic for that block has been determined. A line store 105 may be provided for the image processor to maintain the image parameters of previously processed blocks. For example, if the image processor is configured to operate sequentially on blocks row-by-row, the image processor may be configured to hold at the line store at least some of the image parameters calculated for the blocks of the preceding row and the image parameters calculated for the row being processed. Storing these image parameters can allow the image processor to calculate image parameters for the blocks of the frame in a single pass in the manner described above with reference to equation (3). In implementations using block configurations other than that illustrated in FIG. 2, the line store may be configured to store the image parameters of blocks appropriate to that configuration.

Figure 3:
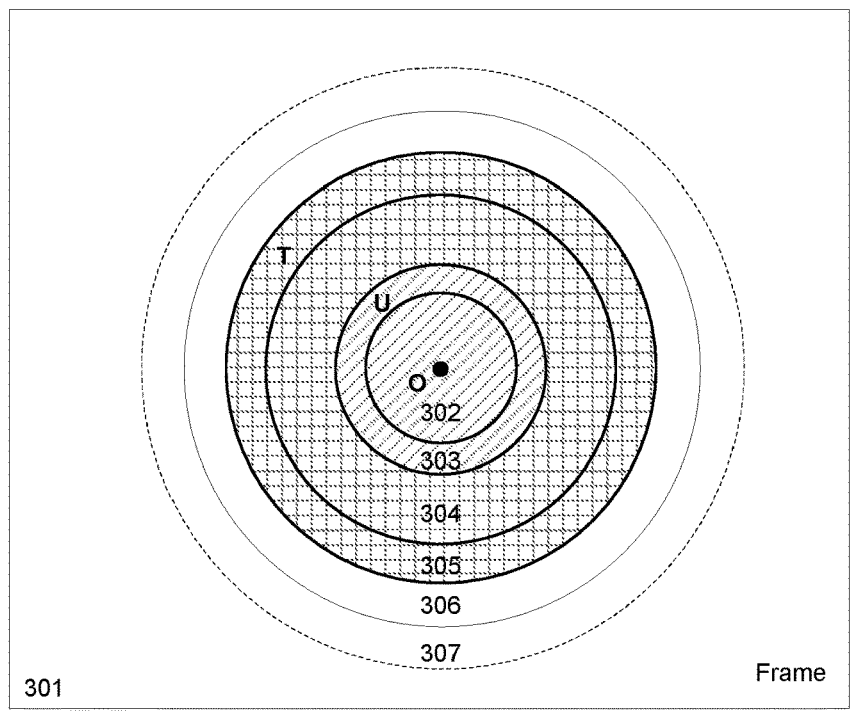
FIG. 3 illustrates a calculation of contrast information for a selected frame area according to a second example.

The predefined zone relative to each given block may have any shape, as appropriate to the coordinate system in use and the shape of the blocks. A second example is shown in FIG. 3 in which the origin O is a point at the centre of the frame 301 and the blocks are concentric rings (e.g. 303, 305, 306, 307) centred on the origin. In this example, the image parameter of block 303 (which is annulus U, rather than a point) is given by the sum of the image characteristics of the blocks lying within the predefined circular zone lying between that block and origin which comprises block 303 itself and the blocks lying in area 302. The image parameter of block 305 (annulus T) is given by the sum of the image characteristics of the blocks lying within the predefined circular zone between that block and the origin which comprises block 305 itself and the blocks lying in areas 302, 303 and 304. These zones are illustrated in FIG. 3 by diagonal and cross-hatch shading, respectively.

Since the position of a given block may be represented by a single radial coordinate, the sum of the image characteristics in a predefined zone relative to a given block at position r in a frame may be calculated according to:

$$I(r)=i(r)+i(r-1) \quad (4)$$

where i(r) is the image characteristic of the block at r and I(r) is the image parameter calculated for block r—e.g. according to the sum shown in equation (4).

Multiple origins and hence predefined zones for a given block could be defined for a frame. FIGS. 2 and 3 illustrate just two possible arrangements of blocks in a frame and approaches to calculating image parameters for those blocks. Many other block arrangements and approaches to calculating image parameters for predefined zones relative to each block may be used in accordance with the principles described herein. Other approaches may calculate an image parameter as a sum of the squares of image characteristics. Frames and the blocks defined for a frame may have any coordinate system, as appropriate to the particular implementation.

The image parameters generated for the blocks of a frame by the image processor 104 collectively represent a statistics frame 106 which is provided to the focus controller. The statistics frame 106 may be used by the focus controller 108 to straightforwardly generate image parameters for any arbitrary region of a frame. For example, the focus controller may calculate the image parameter of area 202 in FIG. 2 according to:

$$I_{202}=I(S)+I(P)-I(Q)-I(R) \quad (5)$$

where I(S), I(P), I(Q) and I(R) are the image parameters of the blocks at points S, P, Q and R respectively. In this example, a statistics frame 106 may be described as a summed area table.

And in the example shown in FIG. 3, the image parameter of the cross-hatched area (304+305) may be calculated according to:

$$I_{304+305}=I(T)-I(U) \quad (6)$$

where I(T) and I(U) are the image parameters of the blocks at annuli T and U respectively.

A statistics frame need not include an image parameter for every block of the frame in respect of which it was calculated by the image processor. A statistics frame may be expressed in any suitable manner and need not represent the image parameters in an array which corresponds in form to that of the frame in respect of which it was calculated (e.g. a frame comprising a rectangular array of blocks as in the example shown in FIG. 2 need not require that the statistics frame comprises a corresponding rectangular array of image parameters with there being a one-to-one correspondence between each block and image parameter). The image parameters may be carried in a statistics frame in a compressed and/or encoded form.

The image parameters of a statistics frame allow the focus controller 108 to calculate an image parameter for a selected focus area 112 of the frame which may not be known to the image processor when it forms the image parameters. The focus controller is configured to perform focus control in dependence on a measure of focus derived from the image parameter calculated for the selected area of the frame. The measure of focus may be the image parameter calculated for the selected area of the frame. Since the image parameters carried in a statistics frame represent a combination of image characteristics (e.g. a sum of contrast values), the focus controller may be configured to normalise the image parameter of a focus area so as to generate a representative image characteristic (e.g. contrast value) for use as the measure of focus for the focus area. Such a representative image characteristic could be an average of the focus area. For example, the measure of focus determined by the focus controller may be the image parameter calculated for the focus area divided by the number of blocks or pixels represented by that focus area in the frame so as to generate an average image characteristic (e.g. contrast) for the focus area.

The focus controller may receive the focus area 112 from any entity supported at or external to the apparatus 100. In some embodiments the focus controller may itself select the focus area. In the example shown in FIG. 1, the focus controller receives the focus area 112 from a focus selector 109. The focus selector may be configured to receive an image frame 107 from the image processor but generally the focus selector may identify a frame area in any manner, whether or not it does so on the basis of an image frame or other representation of a captured frame. The image frame 107 may or may not be the same image frame from which the image processor derives an image characteristic for each block. The image frame 107 may be at any resolution and comprise one or more channels expressed in any colour space (e.g. RGB, YUV). In implementations where captured frames 103 are in a form suitable for processing at the focus selector, an image frame 107 may be a frame 103 passed through the image processor or received directly from camera 102.

The focus selector 109 is configured to determine one or more focus areas on the basis of which focus control is to be performed by the focus controller 108. For example, the focus selector may comprise a face detector 110 configured to identify faces in an image frame 107 and to pass the area in the frame representing the face to the focus controller as a focus area 112. It is typically desired that the faces in an image are in sharp focus and so such areas of an image can make good candidates as focus areas. Apparatus and algorithms for performing face detection are well known in the art.

In a second example, the focus selector may comprise a motion detector 111 configured to identify areas of motion in an image frame 107 and to pass at least part of the area in the frame in which the motion is located to the focus controller as a focus area 112. Motion in an image typically occurs in the foreground, an area which is often desired to be maintained in sharp focus. Such areas of an image can make good candidates as focus areas. Apparatus and algorithms for performing motion detection are well known in the art.

As has been described, the focus controller receives a statistics frame 106 from the image processor which comprises image parameters for blocks of the frame, the image parameter of each block being formed from a combination of image characteristics of the blocks lying within a predefined zone relative to that block. On receiving a selected frame area from the focus selector, the focus controller is configured to identify a set of blocks of the frame whose predefined zones can be combined so as to represent the selected frame area. Since the image parameter of a block is formed over the blocks lying within the predefined zone of that block, the focus controller can form an image parameter for the selected frame area by combining the image parameters of that set of blocks according to the identified combination (e.g. by adding the image parameters of one or more blocks of the set and subtracting the image parameters of one or more other blocks of the set). For example, in FIG. 2 frame area 202 may be represented by the combination of the predefined zones of the blocks at points P, Q, R, and S as described above with respect to equation (5).

In some cases it may be possible for a selected area to be exactly represented by a combination of predefined zones—e.g. where the boundaries of a frame area match exactly with the boundaries of frame blocks. In other cases it may only be possible to substantially represent a selected area through a combination of predefined zones of frame blocks—i.e. the focus controller would be configured to identify a set of predefined zones of blocks which represent an approximation to the selected area. Such cases might occur where the shape of a selected area provided by a focus selector cannot be matched by the shape of frame blocks and/or the boundaries of the frame blocks do not align with the selected area. These cases could be addressed by, for example, constraining the focus selector to indicate focus areas to the focus controller which comprise an integral number of frame blocks, or the focus controller could be configured to interpret focus areas provided by the focus selector as an integral number of frame blocks. Any suitable algorithm may be used to identify a combination of blocks whose respective predefined zones represent an exact or substantial match to a selected frame area.

The focus controller may be configured to perform focus control in any manner appropriate to the nature of the image parameters provided by the image processor. For example, the image parameters may represent sums of contrast values of a number of blocks, with the focus controller being configured to perform focus control in dependence on the contrast of one or more focus areas 112 identified to it by the focus selector. Typically, the focus controller would be configured to control the focus of the camera 102 so as to maximise the contrast at the one or more focus areas, but other algorithms may be used. The focus controller may be arranged to control the focus of camera 102 by returning a suitable focus signal 114 to the camera pipeline 101 (possibly to the camera 102 itself). The focus controller may be configured to receive information describing the focus distance of the camera with each statistics frame so as to enable the focus controller to provide a suitable control signal to the camera pipeline to instruct the camera to adjust its focus distance by an amount and direction determined by the focus controller in accordance with its focus control algorithms.

In the example shown in FIG. 1, the focus controller and focus selector are supported at a graphical processing unit (GPU) 113. The focus controller and/or focus selector may be software modules configured for execution at the GPU, potentially with one or more of the functionalities of the focus controller and/or focus selector being accelerated by suitable hardware functions at the GPU or other components of the apparatus 100. In other examples, the focus controller and/or focus selector could comprise one or more of fixed function processors, one or more reconfigurable processors (e.g. an FPGA), and software running at one or more general purpose processors. The focus controller and/or focus selector could form part of the camera pipeline 101. The focus controller and focus selector may be one and the same functional unit. Any suitable algorithm for performing autofocus control may be used at the focus controller.

Whichever entity provides a focus area 112 to the focus controller, it will be appreciated that the focus area is only known once the focus selector has performed the appropriate processing to identify that area. By being able to form an image parameter on-the-fly for a focus area at the focus controller as soon as the area has been selected, the apparatus described herein can dynamically control the focus of the camera in dependence on the image parameter without introducing additional delay. The improvement this represents over conventional focus systems will now be described with respect to FIG. 4.

Figure 4:
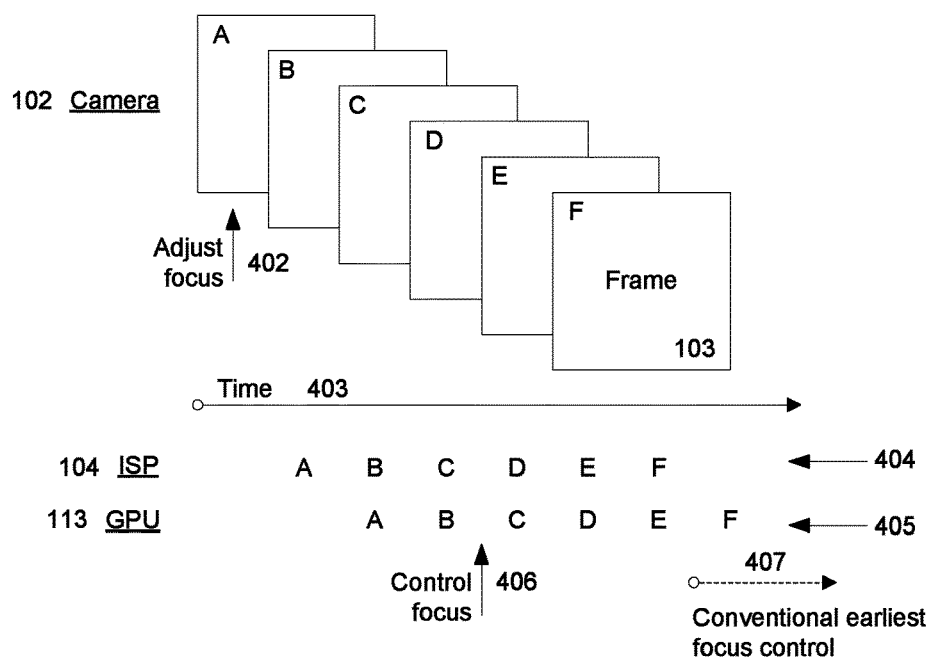
FIG. 4 illustrates the speed with which the apparatus can achieve control of camera focus.

FIG. 4 illustrates the performance of apparatus 100 compared to a conventional contrast autofocus system embodied an image signal processor (ISP) and GPU which is configured to perform focus control in dynamically-identified frame areas. The figures shows an initial sequence of frames 103 captured by the camera 102 and passed (typically in a modified or encoded form) onto the ISP 104 and GPU 113 which perform focus control. The sequence of frames A-F is schematically plotted against time 403. Typically, the camera 102 will capture a frame while the ISP is processing the previously-captured frame, and the GPU is processing the frame before that. Thus the ISP would be running around a frame behind the camera and the GPU would be running around two frames behind the camera. This temporal offset is illustrated in FIG. 4 for the ISP and GPU by frame sequences 404 and 405, respectively.

Since the autofocus technique employed by the focus controller 108 is based on the information present in frames 103 captured by camera 102 rather than signals from a phase detector, on first capturing a frame the camera pipeline would typically be configured to cause the camera to sweep over a range of at least two focal positions in order to enable the focus controller to determine in which direction the focus needs to be adjusted so as to potentially improve the focus of the captured image frames in the focus area(s). In FIG. 4 this is illustrated by the focus adjustment 402 performed between the first frame A and second frame B captured by the camera. Typically a series of focus adjustments are performed and these may not start immediately after the first frame has been captured by the camera, but the simplified scenario shown in FIG. 4 is sufficient to illustrate the performance difference between conventional autofocus systems and the apparatus described herein.

In conventional systems which are able to perform focus control in frame areas identified on-the-fly by the system, the operations performed on an initial sequence of frames might be:

1. The camera captures a sequence of frames.
2. The ISP processes the sequence of frames captured by the camera and generates contrast information for each frame in one or more areas of the frame which are specified by the GPU based on its processing of the captured frames. Initially a predefined set of frame areas may be used. The ISP lags one frame behind the camera.
3. The GPU receives the sequence of frames and the contrast information generated by the ISP. The GPU lags two frames behind the camera.
   a. The GPU processes at least the first frame A in order to identify one or more areas of the image in which focus control is to be performed. For example, the GPU may run a face detection algorithm to identify faces in the image and select one or more of those as focus areas.
   b. The GPU identifies to the ISP the identified areas of the image in which focus control is to be performed. The earliest point at which this can occur is once the GPU has completed processing of at least the first frame A. At this point in time, the camera is about to capture frame D (see FIG. 4).
4. Starting at frame D, the ISP generates contrast information for the focus areas identified by the GPU.
5. The focus distance of the camera is changed between frames D and E: this may be by a predefined amount according to a stored algorithm, but typically at this point the autofocus system takes an initial guess at an improved focus distance for the camera based on contrast information generated at the ISP for frames A and B in respect of predefined regions of the frame.
6. The GPU performs focus control based on the focus area(s) it has identified: this is only possible once both frames D and E have been received at the GPU. This is because (a) two frames captured at different focus distances are required for the GPU to identify the correct direction in which to adjust the focus distance of the camera, and (b) contrast information generated by the ISP must be available for those two frames.

Conventionally, the earliest point at which a conventional autofocus system can perform focus control based on a custom frame area defined by the GPU is therefore between frames E and F. This is indicated by arrow 407 in FIG. 4.

In contrast, the apparatus of FIG. 1 can perform focus control based on a custom frame area defined by the GPU between frames B and C, as indicated by arrow 406 in FIG. 4. Roughly speaking, the operations performed by the apparatus of FIG. 1 on the initial sequence of frames shown in FIG. 4 may be:

1. The camera 102 captures a sequence of frames 103.
2. The image processor 104 processes the sequence of frames captured by the camera and generates a statistics frame 106 for each frame. The image processor lags one frame behind the camera.
3. The focus selector 109 receives the sequence of frames (or data derived therefrom) and identifies one of more focus areas 112. One or more focus areas 112 may be available on the focus selector processing the first frame A (e.g. at face detector 110). The GPU 113 lags two frames behind the camera.
4. As described above (e.g. with reference to equations 5 or 6), the focus controller 108 can immediately derive image parameter(s) for the identified focus area(s) 112 from the statistics frame 106 generated by the image processor in respect of frames A and B (frame B will be available once the focus selector has completed its processing of frame A).
5. Equipped with the image parameter(s) for the identified focus area(s) of frames A and B, and recalling that the focus distance of the camera is adjusted 402 between those frames, the focus controller generates a focus control signal 114 in accordance with its autofocus algorithm at point 406. The focus control signal indicates to the camera pipeline the direction and degree to which the focus distance of the camera should be adjusted so as to move into better focus according to the initial estimate of the autofocus algorithm.

Apparatus configured in accordance with the principles described herein enable a focus controller to generate a measure of focus for a dynamically-selected area of an image from statistics generated by an image processor. In the example described above with respect to FIG. 4 in which focus control is performed at a GPU, the apparatus of FIG. 1 may generate a measure of focus for a dynamically-selected area of an image around three frames earlier (after frame B has been processed rather than after frame E has been processed). Even in other configurations—e.g. where both the image processor and GPU are provided as one or more fixed function processors—apparatus for performing focus control configured in accordance with the principles described herein can control camera focus at substantially lower latency than is possible with conventional solutions.

In particular, the approach described herein allows contrast detection autofocus to be performed at substantially lower latency than is possible in conventional contrast autofocus systems.

Figure 5:
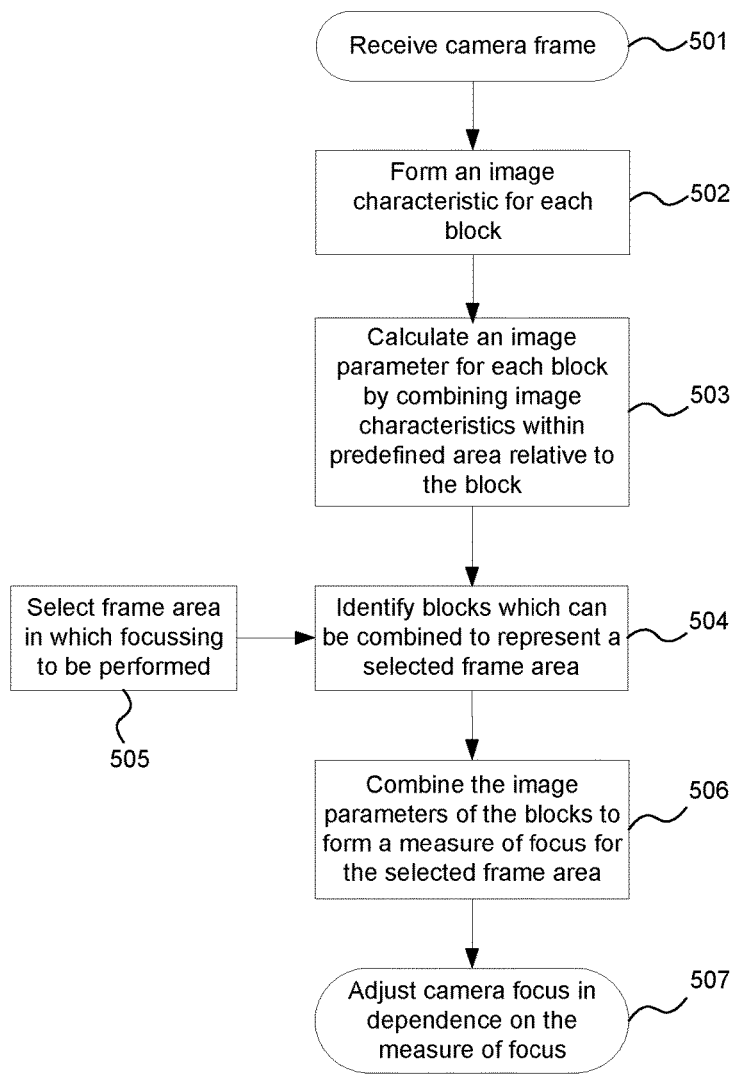
FIG. 5 is a flowchart illustrating a method of controlling the focus of a camera according to the principles described herein.

It should be appreciated that apparatus described herein can generate a measure of focus (e.g. a measure of contrast) for an area of frame from image statistics (e.g. contrast values for frame blocks) generated for the frame when that frame area was not defined at the time those statistics were generated. This aspect is illustrated by the example shown in FIG. 5, which is a flowchart showing a possible operation of the apparatus of FIG. 1.

On receiving a frame from the camera 501, the apparatus forms an image characteristic for blocks of the frame 502. Each block comprises one or more pixels of the camera frame. The apparatus may form image characteristics using an intermediate frame generated at the image processor from the camera frame. The image characteristic of a block may be a measure of local contrast at the block. The apparatus further calculates an image parameter for each block 503 by combining the image characteristics of blocks lying within a predefined zone relative to the block. For example, the contrast values of blocks lying in a set of predefined directions relative to a block may be summed to generate an image parameter for that block.

The apparatus or an external entity selects a frame area 505 in which focussing is to be performed. For example, a face or motion detector could be used to identify areas of a sequence of frames which it is likely represent foreground areas that should be maintained in sharp focus. The apparatus identifies a set of blocks of the image 504 whose predefined zones (within which the image characteristics of blocks were combined so as to form the image parameter for that block) can be combined in order to at least approximately represent the size and shape of the selected frame area. The image parameters of the identified set of blocks may then be combined 506 (e.g. added or subtracted together) according to the identified combination of their respective predefined zones so as to form a measure of focus for the selected frame area. According to its autofocus algorithm, the apparatus can then control the camera focus in dependence on the measure of focus for the selected frame area 507.

The apparatus of FIG. 1 is shown as comprising a number of functional blocks. This is schematic only and is not intended to define a strict division between different logic elements. Each functional block may be provided in any suitable manner. It is to be understood that intermediate values described herein as being formed by an image processor or focus controller need not be physically generated by those entities at any point and may merely represent logical values which conveniently describe the processing performed by those entities between their respective input and output.

Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture apparatus for controlling the focus of a camera as described herein. An integrated circuit definition dataset may be, for example, an integrated circuit description.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS (RTM) and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture apparatus for controlling the focus of a camera will now be described with respect to FIG. 7.

Figure 7:
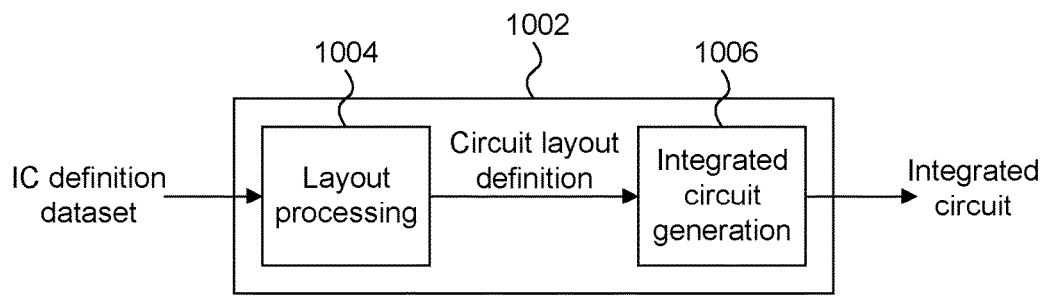
FIG. 7 is a schematic diagram of an integrated circuit manufacturing system.

FIG. 7 shows an example of an integrated circuit (IC) manufacturing system 1002 which comprises a layout processing system 1004 and an integrated circuit generation system 1006. The IC manufacturing system 1002 is configured to receive an IC definition dataset (e.g. defining apparatus for controlling the focus of a camera as described in any of the examples herein), process the IC definition dataset, and generate an IC according to the IC definition dataset (e.g. which embodies apparatus for controlling the focus of a camera as described in any of the examples herein). The processing of the IC definition dataset configures the IC manufacturing system 1002 to manufacture an integrated circuit embodying apparatus for controlling the focus of a camera as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture apparatus for controlling the focus of a camera without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 7 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 7, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

The invention claimed is:

1. Apparatus for controlling the focus of a camera arranged to capture a sequence of frames, the apparatus comprising:
an image processor configured to:
form an image characteristic for a plurality of blocks of a first frame, each block of the plurality of blocks comprising one or more pixels of the first frame; and
calculate an image parameter for each block of the plurality of blocks by combining the image characteristic of that block with the image characteristics of other blocks of the plurality of blocks lying within a predefined zone relative to that block;
and
a focus controller configured to derive a measure of focus for a selected frame area of the first frame by identifying a set of blocks whose respective predefined zones, when combined, substantially represent the selected frame area, and forming a measure of focus for the selected frame area by so combining the image parameters of the set of blocks;
wherein the focus controller is configured to generate a signal for controlling camera focus in dependence on the measure of focus formed for the selected frame area of the first frame.

2. Apparatus as claimed in claim 1, wherein the image characteristic of each block is a measure of local contrast at that block.

3. Apparatus as claimed in claim 1, wherein the image processor is configured to form the image characteristic at each block in dependence on the values of a plurality of pixels of the block or adjacent to the block in the first frame.

4. Apparatus as claimed in claim 1, wherein the image processor is configured to calculate the image parameter for each block by summing the image characteristic of that block with the image characteristics of other blocks of the plurality of blocks lying within the predefined zone relative to that block.

5. Apparatus as claimed in claim 1, wherein the predefined zone relative to a given block includes: all blocks whose component coordinates are less than or equal to those of the given block, including the given block itself; all blocks whose component coordinates are greater than or equal to those of the given block, including the given block itself; or, all blocks having a first component coordinate greater than or equal to the corresponding first coordinate of the given block and a second component coordinate less than or equal to the corresponding second coordinate of the given block, including the given block itself.

6. Apparatus as claimed in claim 1, further comprising a focus selector configured to identify the selected frame area in dependence on image data of the first frame.

7. Apparatus as claimed in claim 6, wherein the focus selector is configured to process the first frame and/or a preceding frame of a sequence of frames comprising the first frame so as to identify the selected frame area.

8. Apparatus as claimed in claim 6, wherein the focus selector is configured to derive the measure of focus for the selected frame area of the first frame by means of a linear combination of the image parameters of the set of blocks, the linear combination being performed according to the identified combination of the predefined zones of the set of blocks which substantially represents the selected frame area.

9. Apparatus as claimed in claim 6, wherein the focus selector is configured to identify the selected frame area in a sequence of frames comprising the first frame in dependence on one or more of: a variation in image sharpness; the location of faces identified in the sequence of frames; and the location of motion identified in the sequence of frames.

10. Apparatus as claimed in claim 1, wherein the apparatus is arranged to operate on a sequence of frames comprising the first frame and a preceding second frame, the focus controller being configured to derive a measure of focus for the selected frame area of the second frame and the focus controller being configured to generate the signal for controlling camera focus in dependence on a comparison of the measures of focus derived for the selected frame area of the first and second frames.

11. A method of controlling the focus of a camera arranged to capture a sequence of frames, the method comprising:
receiving a first frame;
forming an image characteristic for a plurality of blocks of the first frame, each block of the plurality of blocks comprising one or more pixels of the first frame;
calculating an image parameter for each block of the plurality of blocks by combining the image characteristics of that block with the image characteristics of other blocks of the plurality of blocks lying within a predefined zone relative to that block;
identifying a set of blocks whose respective predefined zones, when combined, substantially represent a selected frame area;
forming a measure of focus for the selected frame area by combining the image parameters of the set of blocks according to the identified combination of the set of blocks which substantially represents the selected frame area; and
adjusting camera focus in dependence on the measure of focus formed for the selected frame area of the first frame.

12. A method as claimed in claim 11, wherein the image characteristic of each block is a measure of local contrast at that block.

13. A method as claimed in claim 11, wherein the forming of the image characteristic at each block is performed in dependence on the values of a plurality of pixels of the block or adjacent to the block in the first frame.

14. A method as claimed in claim 11, wherein the calculation of the image parameter for each block comprises summing the image characteristics of that block with the image characteristics of other blocks of the plurality of blocks lying within the predefined zone relative to that block.

15. A method as claimed in claim 11, wherein the predefined zone relative to a given block includes: all blocks whose component coordinates are less than or equal to those of the given block, including the given block itself; or, all blocks whose component coordinates are greater than or equal to those of the given block, including the given block itself.

16. A method as claimed in claim 11, wherein the identifying the selected frame area comprises processing the first frame and/or a preceding frame of a sequence of frames comprising the first frame so as to identify the selected frame area.

17. A method as claimed in claim 16, wherein the identifying the selected frame area is performed in dependence on one or more of: a variation in image sharpness; the location of faces identified in the sequence of frames; and the location of motion identified in the sequence of frames.

18. A method as claimed in claim 11, wherein the forming the measure of focus for the selected frame area of the first frame comprises performing a linear combination of the image parameters of the set of blocks, the linear combination being performed according to the identified combination of the predefined zones of the set of blocks which substantially represents the selected frame area.

19. A method as claimed in claim 11, further comprising:
receiving a second frame;
forming an image characteristic for the plurality of blocks of the second frame, each block comprising one or more pixels of the second frame;
calculating an image parameter for each block by combining the image characteristics of other blocks lying within a predefined zone relative to that block; and
forming a measure of focus for the selected frame area of the second frame by combining the image parameters of the set of blocks according to the identified combination of the set of blocks which substantially represents the selected frame area;
wherein the adjusting camera focus comprises controlling camera focus in dependence on a comparison of the measures of focus derived for the selected frame area of the first and second frames.

20. A non-transitory computer readable storage medium having stored thereon computer readable instructions that, when executed at a computer system, cause the computer system to perform a method of controlling the focus of a camera arranged to capture a sequence of frames, the method comprising:
receiving a first frame;
forming an image characteristic for a plurality of blocks of the first frame, each block of the plurality of blocks comprising one or more pixels of the first frame;
calculating an image parameter for each block of the plurality of blocks by combining the image characteristics of that block with the image characteristics of other blocks of the plurality of blocks lying within a predefined zone relative to that block;
identifying a set of blocks whose respective predefined zones, when combined, substantially represent a selected frame area;
forming a measure of focus for the selected frame area by combining the image parameters of the set of blocks according to the identified combination of the set of blocks which substantially represents the selected frame area; and
adjusting camera focus in dependence on the measure of focus formed for the selected frame area of the first frame.

* * * * *